United States Patent
Kulkarni

(10) Patent No.: US 9,452,385 B1
(45) Date of Patent: Sep. 27, 2016

(54) HYBRID MEMBRANE AND ADSORPTION-BASED SYSTEM AND PROCESS FOR RECOVERING $CO_2$ FROM FLUE GAS AND USING COMBUSTION AIR FOR ADSORBENT REGENERATION

(71) Applicant: L'Air Liquide, Societe Anonyme pour l'Etude et l'Exploitation des Procedes Georges Claude, Paris (FR)

(72) Inventor: Sudhir S. Kulkarni, Wilmington, DE (US)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 14/638,631

(22) Filed: Mar. 4, 2015

(51) Int. Cl.
| | |
|---|---|
| *B01D 53/047* | (2006.01) |
| *B01D 53/22* | (2006.01) |
| *B01D 53/00* | (2006.01) |
| *F23J 15/02* | (2006.01) |
| *C01B 31/20* | (2006.01) |

(52) U.S. Cl.
CPC ........... *B01D 53/229* (2013.01); *B01D 53/002* (2013.01); *B01D 53/047* (2013.01); *C01B 31/20* (2013.01); *F23J 15/02* (2013.01); *B01D 2257/504* (2013.01); *B01D 2258/0283* (2013.01)

(58) Field of Classification Search
CPC B01D 53/002; B01D 53/229; B01D 53/047; B01D 2257/504; B01D 2258/0283; C01B 31/20; F23J 15/02

USPC .............. 95/51, 96; 96/4, 7, 9, 121; 423/230
See application file for complete search history.

(56) References Cited

U.S. PATENT DOCUMENTS

| | | |
|---|---|---|
| 6,183,628 B1 | 2/2001 | Baker et al. |
| 6,695,043 B1 | 2/2004 | Wagner et al. |
| (Continued) | | |

FOREIGN PATENT DOCUMENTS

| | | |
|---|---|---|
| EP | 1008826 A1 | 12/2006 |
| FR | 2930464 A1 | 10/2009 |
| (Continued) | | |

OTHER PUBLICATIONS

Freeman, et al. "Bench-Scale Development of a Hybrid Membrane-Absorption CO2 Capture Process (DE-FE0013118)", Dec. 20, 2013 Kickoff Meeting.

(Continued)

*Primary Examiner* — Frank Lawrence
(74) *Attorney, Agent, or Firm* — Christopher J. Cronin

(57) ABSTRACT

$CO_2$ may be recovered from flue gas by a hybrid system utilizing both gas separation membranes and adsorption. Purified flue gas is separated by the gas separation membrane into permeate and non-permeate streams. The permeate stream is compressed, partially condensed at a heat exchanger, and phase-separated to produce a vent gas and high purity liquid $CO_2$. The vent gas is recycled to the membrane. The non-permeate is fed to a PSA unit. The $CO_2$ blow-down from the PSA unit is also compressed with the permeate stream. The adsorbent in the PSA unit is regenerated with combustion air and the $CO_2$-containing combustion air is fed to a combustor for combustion with fuel and an oxidant to produce the flue gas.

19 Claims, 5 Drawing Sheets

(56) References Cited

U.S. PATENT DOCUMENTS

| | | | |
|---|---|---|---|
| 8,557,024 B2 * | 10/2013 | Reddy | B01D 53/002 62/606 |
| 8,585,802 B2 * | 11/2013 | Keller | C01B 3/501 423/220 |
| 8,591,769 B2 | 11/2013 | Vauk et al. | |
| 8,617,292 B2 | 12/2013 | Hasse et al. | |
| 8,663,364 B2 | 3/2014 | Hasse et al. | |
| 8,728,201 B2 | 5/2014 | Nazarko et al. | |
| 8,734,569 B2 | 5/2014 | Hasse et al. | |
| 2009/0013868 A1 | 1/2009 | Darde et al. | |
| 2009/0013871 A1 | 1/2009 | Darde et al. | |
| 2009/0211733 A1 | 8/2009 | Tranier et al. | |
| 2010/0024476 A1 * | 2/2010 | Shah | B01D 53/002 62/617 |
| 2010/0263529 A1 | 10/2010 | Alban et al. | |
| 2010/0322843 A1 | 12/2010 | Court et al. | |
| 2011/0035942 A1 | 2/2011 | Crayssac et al. | |
| 2011/0036548 A1 | 2/2011 | Crayssac et al. | |
| 2011/0247491 A1 * | 10/2011 | Leitgeb | B01D 53/047 95/41 |
| 2013/0205828 A1 * | 8/2013 | Sethna | F25J 1/0022 62/607 |

FOREIGN PATENT DOCUMENTS

| | | |
|---|---|---|
| FR | 2930465 A1 | 10/2009 |
| FR | 2930466 A1 | 10/2009 |
| WO | WO2009010690 A2 | 1/2009 |
| WO | WO2009013717 A2 | 1/2009 |
| WO | WO2009095581 A2 | 8/2009 |
| WO | WO2014009449 A1 | 1/2014 |

OTHER PUBLICATIONS

Merkel, et al., "Power plant post-combustion carbon dioxide capture: An opportunity for membranes", Journal of Membrane Science 359 (2010) 126-139.

* cited by examiner

HYBRID MEMBRANE AND ADSORPTION-BASED SYSTEM AND PROCESS FOR RECOVERING $CO_2$ FROM FLUE GAS AND USING COMBUSTION AIR FOR ADSORBENT REGENERATION

CROSS-REFERENCE TO RELATED APPLICATIONS

None.

BACKGROUND

1. Field of the Invention

The present invention relates to a process and apparatus for the separation of gaseous mixture containing carbon dioxide as main component. It relates in particular to processes and apparatus for purifying carbon dioxide, for example coming from combustion of a carbon containing fuel, such as takes place in an air-fired or oxycombustion fossil fuel or biomass power plant.

2. Related Art

Various techniques based on solvent, sorbents, and membranes have been proposed for $CO_2$ capture from power plants or industrial sources. Some techniques utilize a medium (e.g., amines) for capturing $CO_2$ through chemical affinity. However, the energy needed for regenerating the medium (having chemical affinity for $CO_2$) is significantly high. Other solvents and adsorbents capture $CO_2$ through physical affinity. While the energy necessary for regenerating such solvents and adsorbents is relatively lower than that the media having chemical affinity for $CO_2$, they typically have a relatively lower capacity for $CO_2$ resulting in higher equipment capital costs On the other hand, membranes use a combination of physical affinity and diffusivity. The driving force for transport through membranes is the difference between $CO_2$ partial pressure across the membrane (i.e., the feed partial pressure minus the permeate partial pressure).

Regardless of the technique employed to recover $CO_2$, high $CO_2$ recoveries from feed gases is desirable for a variety of reasons. For example, the U.S. Department of Energy (DOE) has set a target recovery for recovering $CO_2$ from power plants. As another example, high $CO_2$ recoveries allow more $CO_2$ product gas to be sold or used in order to recover the costs associated with the pre-treatment of the flue gas necessary for recovery. However, in the case of $CO_2$ recovery utilizing membrane separation, as more and more $CO_2$ is sought to be recovered, the driving force across the membrane decreases and approaches a pinch point beyond which additional recovery comes at the expense of high compression energy costs or high membrane surface areas. Thus, for some levels of $CO_2$ recovery, this problem has the potential to increase capital and operating expenses to unsatisfactory levels.

Each of U.S. Pat. No. 8,617,292, U.S. Pat. No. 8,663,364, and U.S. Pat. No. 8,734,569 discloses that operation of membranes at relatively cold temperatures is highly effective for $CO_2$ capture. Cold temperature operation leads to high membrane selectivity with negligible membrane permeance loss or even possibly an enhancement in membrane permeance. While operation of cold membranes is quite efficient, higher and higher $CO_2$ recoveries may be desired without concomitant unsatisfactorily high increases in capital and operating expenses.

Membranes are known to be efficient for bulk separation of gases when the driving force is high. They have been used in combination with other, subsequent, gas separation techniques in order to achieve an overall $CO_2$ recovery. Such hybrid systems are known where a membrane performs a bulk $CO_2$ separation from natural gas followed by amine treatment of the lower concentration membrane residue stream. Hybrid combinations of solvent (e.g. piperazine) and membrane have also been studied for $CO_2$ capture from flue gas.

One particular two unit separation process is disclosed by U.S. Pat. No. 8,728,201 including a membrane utilizing a vacuum on a permeate side that is followed with an absorption (solvent) to remove $CO_2$ from the membrane residue. There is little integration between the two unit operations.

One particular U.S. Department of Energy funded project uses a costly and cumbersome plate and frame membrane system to operate with an air sweep at low pressures. In this approach, the membrane is placed in series—after the solvent unit or in parallel with the solvent unit (Freeman, et al. "Bench-Scale Development of a Hybrid Membrane-Absorption $CO_2$ Capture Process", Dec. 20, 2013 Kickoff Meeting).

Hybrid processes combining adsorption and membranes are also known. For example, U.S. Pat. No. 8,591,769 and U.S. Pat. No. 6,183,628 discuss membrane treatment of PSA vent gas to recover $H_2$. However, if this technique was applied to flue gas, such a scheme would require use of a less optimum adsorbent that is exposed to many impurities Co-adsorption of moisture and other acid gas components in flue gas prevents optimum adsorption of $CO_2$.

WO14009449 A1 proposes to combine membrane and adsorption processes for moisture removal.

Membranes can be swept with a sweep gas in order to overcome the above-described membrane driving force pinch problem. U.S. Pat. No. 8,734,569 discloses that this can be done by diverting a small fraction of gas (that is derived from the low $CO_2$ concentration residue) to sweep the permeate side of a membrane module. For a low sweep rate, the permeate $CO_2$ concentration decreases marginally but the membrane area can be decreased significantly. However for high sweep rates, permeate $CO_2$ concentrations can decrease significantly.

Another sweep concept, particularly applicable to $CO_2$ capture from flue gas, utilizes a two step membrane process (Merkel, et al., "Power plant post-combustion carbon dioxide capture: An opportunity for membranes", Journal of Membrane Science 359 (2010) 126-139). The $1^{st}$ permeate at relatively high $CO_2$ purity is sent for further $CO_2$ purification. The $2^{nd}$ membrane is swept with an air stream to achieve high $CO_2$ recovery. The air stream is then sent to the boiler island where the recovered $CO_2$ dilutes the overall stream, imposing a small energy penalty for combustion.

SUMMARY OF THE INVENTION

There is a need for membrane-based $CO_2$ recovery processes that do not require unsatisfactorily high capital and operating expenses.

There is also a need for increased integration of hybrid membrane gas separation schemes for recovery of $CO_2$, especially from flue gas.

There is a yet another need for a hybrid membrane gas separation scheme for recovery of $CO_2$, especially from flue gas, that does not require the use of less than optimal adsorbents and/or adsorbents which must be contacted with too many impurities.

There is yet another need for a sweep gas-based membrane separation scheme for recovery of $CO_2$, especially from flue gas, that that does not result in an unsatisfactory decrease in the permeate $CO_2$ concentration.

There is disclosed a method for recovering $CO_2$ from flue gas that comprises the following steps. Impurities are removed from a flue gas stream to provide a purified flue gas stream. The purified flue gas stream is compressed at a first compressor and fed to a gas separation membrane unit comprising one or more gas separation membranes to produce a permeate stream and a non-permeate stream deficient in $CO_2$ compared to the permeate stream. The permeate stream is compressed at a second compressor. The permeate stream is cooled to produce a partially condensed permeate stream. The partially condensed permeate stream is separated into a $CO_2$-deficient vent gas stream deficient in $CO_2$ compared to partially condensed permeate stream and high purity liquid $CO_2$ product. The $CO_2$-deficient vent gas stream is recycled to the gas separation membrane unit. The non-permeate stream is fed to a PSA unit comprising one or more adsorbent beds to produce a further $CO_2$-depleted vent gas stream depleted in $CO_2$ compared to the non-permeate stream, a $CO_2$ blow-down stream enriched in $CO_2$ compared to the non-permeate stream, and a regeneration product stream. The $CO_2$ blow-down stream is compressed at the second compressor along with the permeate stream. The regeneration product stream is combusted at a combustor that produces the flue gas. The regeneration product stream is produced by feeding a stream of air to the PSA unit to regenerate one of said one or more adsorbent beds and desorb $CO_2$ therefrom. The regeneration product stream is air enriched with the desorbed $CO_2$.

There is disclosed a system for recovering $CO_2$ from flue gas, comprising: a combustor adapted and configured to combust fuel, oxidant, and supplemental oxidant to produce a flue gas stream; a purification unit in fluid communication with the combustor that is adapted and configured to purify the flue gas stream and produce a purified flue gas stream; a first compressor in fluid communication with the purification unit that is adapted and configured to compress the purified flue gas stream; a gas separation membrane unit in fluid communication with the first compressor that comprising one or more gas separation membranes adapted and configured to receive a feed gas stream from the first compressor and separate the feed gas stream into a permeate gas stream and a non-permeate gas stream that is deficient in $CO_2$ compared to the permeate gas stream; a second compressor in fluid communication with the gas separation membrane unit that is adapted and configured to receive and compress the permeate gas stream to produce a compressed permeate gas stream; at least one heat exchanger, at least one of the at least one heat exchanger being in heat transfer relation with the compressed permeate gas stream and being adapted and configured to partially condense the compressed permeate gas stream to produce a partially condensed permeate stream, at least one of the at least one heat exchanger being in heat transfer relation with the feed gas stream; a PSA unit comprising one or more adsorbent beds in fluid communication with the gas separation membrane unit that is adapted and configured to receive the non-permeate gas stream and an air stream and produce a $CO_2$ blow-down gas stream is enriched in $CO_2$ compared to the non-permeate gas stream, a further $CO_2$-depleted vent gas stream, and a regeneration product stream, the one or more adsorbent beds being adapted and configured to adsorb $CO_2$ from the non-permeate stream, the regeneration product stream comprising air and $CO_2$ desorbed from the one or more adsorbent beds by the air stream, the second compressor being further adapted and configured to compress the $CO_2$ blow-down stream from the PSA unit along with the permeate stream, the combustor being further adapted and configured to receive the regeneration product stream from the PSA unit; and a phase separation unit in fluid communication with the second compressor that is adapted and configured to receive the partially condensed permeate stream from the heat exchanger and separate the partially condensed permeate stream into a $CO_2$-deficient vent gas stream deficient in $CO_2$ compared to partially condensed permeate stream and a high purity liquid $CO_2$ stream, wherein the first compressor is further adapted and configured to compress the $CO_2$-deficient vent gas stream along with the compressed purified flue gas.

The method and/or system may include one or more of the following aspects:

the compressed purified flue gas stream is cooled at a heat exchanger to a temperature ranging from 20° C. to −60° C.

the further $CO_2$-depleted vent gas stream is expanded to lower a temperature thereof, wherein the compressed purified flue gas stream is cooled through heat exchange at the heat exchanger with the expanded further $CO_2$-depleted vent gas stream.

the compressed purified flue gas stream is cooled through heat exchange at the heat exchanger with the $CO_2$-deficient vent gas stream prior to feeding the $CO_2$-deficient gas stream to the gas separation membrane unit.

the $CO_2$-deficient vent gas stream is heat exchanged two times with the compressed purified flue gas stream and the $CO_2$-deficient vent gas stream is expanded to lower a temperature thereof in between the two times.

the high purity liquid $CO_2$ product is vaporized at the heat exchanger to produce a high purity $CO_2$ product gas, wherein the compressed purified flue gas stream is cooled through heat exchange at the heat exchanger with the high purity liquid $CO_2$ product.

the non-permeate stream is expanded to lower a temperature thereof prior to being fed to the PSA unit, wherein compressed purified flue gas stream is cooled through heat exchange at the heat exchanger with the expanded non-permeate stream.

the non-permeate stream is heat exchanged two times with the compressed purified flue gas stream and the non-permeate stream is expanded in between the two times.

said step of separating is performed by separating the partially condensed permeate stream in a phase separator.

step of separating is performed by: separating the partially condensed permeate stream in a first phase separator into a first $CO_2$-deficient vent gas stream deficient in $CO_2$ compared to partially condensed permeate stream and a first high purity liquid $CO_2$ stream; expanding the first $CO_2$-deficient vent gas stream for partial condensation thereof; separating the partially condensed first $CO_2$-deficient vent gas stream into a second $CO_2$-deficient vent gas stream deficient in $CO_2$ compared to partially condensed permeate stream and a second high purity liquid $CO_2$ stream; and combining the first and second high purity liquid $CO_2$ streams to produce the high purity liquid $CO_2$ product.

said step of separating is performed by: separating the partially condensed permeate stream in a first phase separator into a first $CO_2$-deficient vent gas stream deficient in $CO_2$ compared to partially condensed permeate stream and a first high purity liquid $CO_2$ stream; expanding the first $CO_2$-deficient vent gas stream for partial condensation thereof; separating the partially condensed first $CO_2$-deficient vent gas stream into a second $CO_2$-deficient vent gas stream deficient in $CO_2$ compared to partially condensed permeate stream and a second high purity liquid $CO_2$ stream; expanding each of the first and second high purity liquid $CO_2$ streams at first and second Joule-Thomson expanders;

feeding the expanded high purity liquid $CO_2$ streams to a distillation column; withdrawing the high purity liquid $CO_2$ product from a bottom of the distillation column; and withdrawing a $CO_2$-deficient vapor stream from a top of the distillation column, wherein the $CO_2$-deficient vent gas stream is comprised of the second $CO_2$-deficient vent gas stream and the $CO_2$-deficient vapor stream.

an expander is adapted and configured to expand the further $CO_2$-depleted vent gas stream to lower a temperature of the further $CO_2$-depleted vent gas stream, wherein at least one of the at least one heat exchanger is in heat transfer relation between, on one hand, the further $CO_2$-depleted vent gas stream, and on the other hand, either the feed gas stream or the compressed permeate stream.

at least one of the at least one heat exchanger is in heat transfer relation between the feed gas stream and the $CO_2$-deficient vent gas stream.

at least one of the at least one heat exchanger is in heat transfer relation between the high purity liquid $CO_2$ product and the feed gas stream and is further adapted and configured to vaporize the high purity liquid $CO_2$ product to produce a high purity $CO_2$ gas product.

an expander is adapted and configured to expand the non-permeate stream to lower a temperature thereof, wherein at least one of the at least one heat exchanger is in heat transfer relation between the expanded non-permeate stream and the feed gas stream.

the phase separation unit comprises one phase separator vessel.

the phase separation unit comprises first and second phase separator vessels and a Joule-Thomson expander; the first phase separator vessel is in fluid communication with the second compressor and is adapted and configured to receive the partially condensed permeate stream for phase separation into a first $CO_2$-deficient vent gas stream and a first liquid $CO_2$ stream; the Joule-Thomson expander is in fluid communication between the first and second phase separator vessels and is adapted and configured to expand the first $CO_2$-deficient vent gas stream for partial condensation thereof; the second phase separator vessel is in fluid communication with the Joule-Thomson valve and is adapted and configured to receive the partially condensed first $CO_2$-deficient vent gas stream for separation into a second $CO_2$-deficient vent gas stream and a second liquid $CO_2$ stream; the high purity liquid $CO_2$ product is comprised of the first and second high purity liquid $CO_2$ streams; and the first compressor is in fluid communication with the second phase separator vessel to receive the second $CO_2$-deficient vent gas stream as the $CO_2$-deficient vent gas stream.

the phase separation unit comprises first and second phase separator vessels, first, second, and third Joule-Thomson valves, and a distillation column; the first phase separator vessel is in fluid communication with the second compressor and is adapted and configured to receive the partially condensed permeate stream for phase separation into a first $CO_2$-deficient vent gas stream and a first liquid $CO_2$ stream; the first Joule-Thomson expander is in fluid communication between the first and second phase separator vessels and is adapted and configured to expand the first $CO_2$-deficient vent gas stream for partial condensation thereof; the second phase separator vessel is in fluid communication with the first Joule-Thomson valve and is adapted and configured to receive the partially condensed first $CO_2$-deficient vent gas stream for separation into a second $CO_2$-deficient vent gas stream and a second liquid $CO_2$ stream; the second and third Joule-Thomson valves are in fluid communication between the first and second phase separator vessel, respectively, and the distillation column; the second and third Joule-Thomson valves are adapted and configured to expand the first and second liquid $CO_2$ streams; the distillation column is adapted and configured to receive the expanded first and second liquid $CO_2$ streams and produce a high purity liquid $CO_2$ stream and a $CO_2$-deficient vapor stream; the high purity liquid $CO_2$ product is comprised of the high purity liquid $CO_2$ stream; and first compressor is in fluid communication with the second phase separator vessel to receive the second $CO_2$-deficient vent gas stream and the distillation column to receive the $CO_2$-deficient vapor stream.

the flue gas contains 3-90% vol $CO_2$.

a non-$CO_2$ balance of the flue gas is predominantly $N_2$.

the flue gas is obtained from an air-fired coal combustion plant and contains 8-16% vol $CO_2$.

the flue gas is obtained from an air-fired natural gas combustion plant and contains 3-10% vol $CO_2$.

the flue gas is obtained from an oxycoal combustion plant combusting coal with pure oxygen or synthetic air and contains 60-90% vol $CO_2$.

the flue gas is obtained from a steam methane reformer and contains 15-90% vol $CO_2$.

the flue gas is obtained from a blast furnace and contains 20-90% $CO_2$.

the flue gas comprises 4-30% vol $CO_2$.

BRIEF DESCRIPTIONS OF THE DRAWINGS

DETAILED DESCRIPTION OF THE INVENTION

Disclosed is a method and system of recovering $CO_2$ from flue gas to provide purified $CO_2$. The method combines the benefits of the gas separation techniques of membranes and adsorption, but integrates the two to maximize efficiencies. For example, a recovery of greater than approximately 90% of the $CO_2$ from the flue gas of an existing air-fired coal power plant may be possible with a less than approximately 35% increase in the plant's cost of electricity.

The flue gas may be obtained or derived from suitable combustion processes such as steam methane reforming (SMR), blast furnaces, and air-fired or oxygen-enhanced combustion of fossil fuels (such as in power plants). In the case of oxygen-enhanced fossil fuel combustion processes, the combustion may be full oxycombustion or partial oxycombustion. In full oxycombustion, the primary and secondary oxidants (and tertiary and quaternary oxidants, if present) may be pure oxygen or synthetic air comprising oxygen and recycled flue gas. In partial oxycombustion, one or more of the oxidants may be air and one or more of the remaining oxidants may be oxygen or synthetic air (a mixture of oxygen and recycled flue gas), or alternatively, one or more of the oxidants may be oxygen-enriched air. Pure oxygen means that the oxidant has a concentration typically found in conventional industrial oxygen production processes such as in cryogenic air separation units. The oxygen concentration of synthetic air may range from a concentration at, or above that, of oxygen in air to a concentration less than pure oxygen.

The flue gas contains 3-90% vol $CO_2$. Other components that may be contained within the flue gas include but are not limited to other combustion byproducts, such as water, methane, nitrogen, oxygen, argon, carbon monoxide, oxides of sulfur, and oxides of nitrogen. Typically, the non-$CO_2$ balance of the flue gas is predominantly $N_2$. Flue gas obtained from an air-fired coal combustion plant typically contains 8-16% vol $CO_2$, while flue gas obtained from an air-fired natural gas combustion plant typically contains 3-10% vol $CO_2$. Flue gas obtained from an oxycoal combustion plant (i.e., coal combusted with pure oxygen or synthetic air) typically contains 60-90% vol $CO_2$ with a balance of water, nitrogen, oxygen, argon, carbon monoxide, oxides of sulfur, and oxides of nitrogen. Flue gas obtained from a steam methane reformer typically contains 15-90% vol $CO_2$ with a balance of water, methane, nitrogen, oxygen, argon, carbon monoxide, oxides of sulfur, and oxides of nitrogen. Flue gas obtained from a blast furnace typically contains 20-90% $CO_2$ with a balance of water, hydrogen, nitrogen, oxygen, argon, carbon monoxide, oxides of sulfur, and oxides of nitrogen. Typically, the flue gas comprises 4-30% vol $CO_2$.

Figure 1:
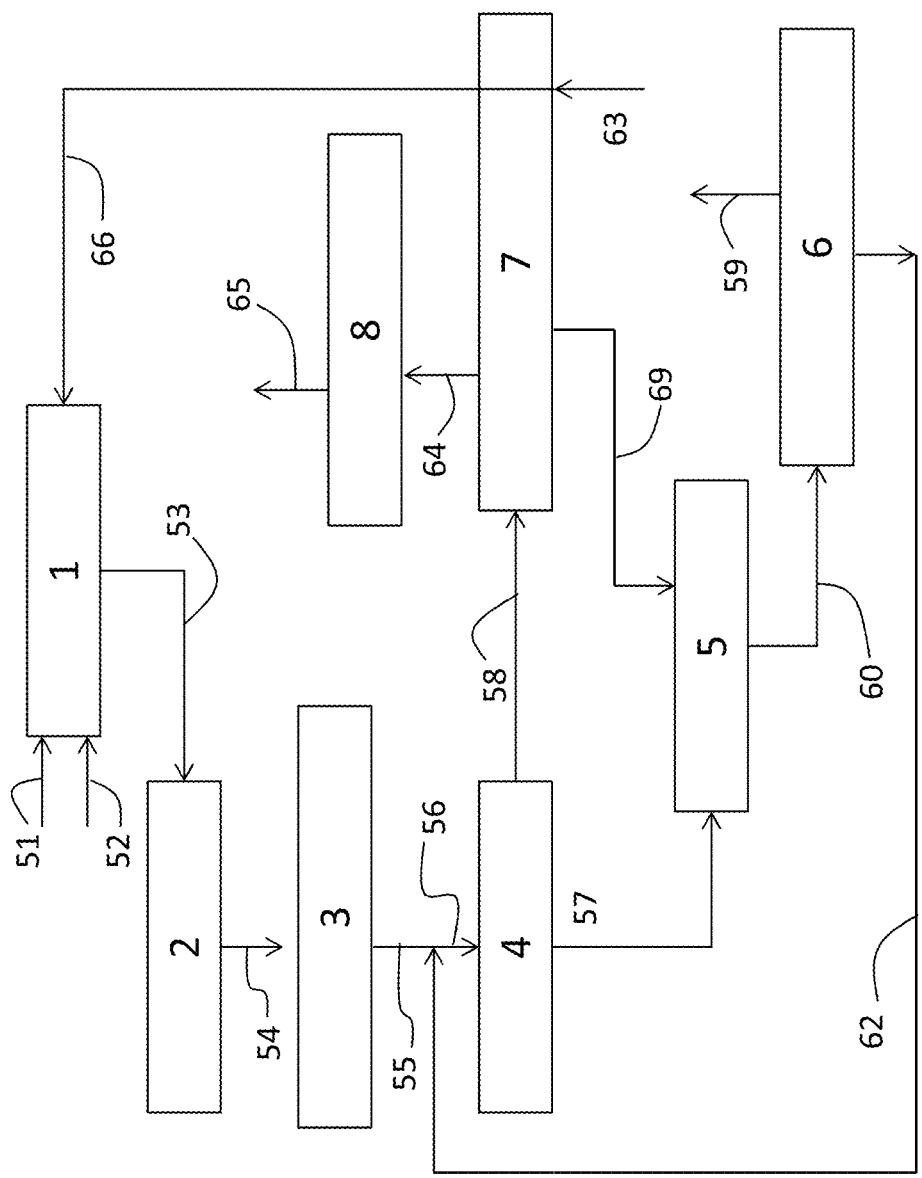
FIG. 1 is a schematic of the inventive method and system.

As best illustrated in FIG. 1, a fuel stream 51, one or more oxidant streams 52 and a supplemental oxidant stream 66 are combusted at a combustor 1, thereby producing a raw flue gas stream 53. While the type of fuel in fuel stream 51 and the type of combustor 1 are not limited, typically the fuel is natural gas or coal and the combustor 1 is a boiler. One or more streams of the one or more oxidant streams 52 may be air, oxygen-enriched air, and/or industrially pure oxygen. The supplemental oxidant stream 66 is described below. It or they may be fed as primary air with or without secondary air, tertiary air, and quaternary air. One of ordinary skill in the field of combustion will recognize that the terms "primary air", "secondary air", "tertiary air", and "quaternary air" are not meant as being limited to air, but rather encompass oxygen-enriched air and industrially pure oxygen as well.

Raw stream 53 is fed to a purification unit 2 for removal of impurities. Suitable treatment methods include but are not limited to those disclosed in WO 2009010690, WO 2009095581, and U.S. Published Patent Application Nos. US 2009013717, US2009013868, and US2009013871, the treatment methods of which are incorporated herein by reference in their entireties. The moisture content of the raw stream 53 should be reduced to a low level for a variety of reasons. First, it is desirable to avoid competition for the adsorbent (in the downstream PSA unit 7) by moisture and $CO_2$. In the case of sub-ambient membrane operation in gas separation membrane unit 4, it is desirable to avoid the freezing of moisture on cold surfaces in any heat exchanger present. Known drying materials and adsorbent-based processes include alumina, silica, or molecular sieves. Condensation of moisture through cooling may also be used to lower the moisture content of raw gas stream 53. In addition to moisture, the purification unit 2 typically removes particulates with filters and acid gases, such as NO and $So_x$, with scrubbers.

The purified flue gas stream 54 is then compressed at a compression unit 3 to boost its pressure to about 4-20 bar. The compression unit 3 includes one or more compressors. In between multiple compression stages (in the case of a multi-stage compressor), stream 54 may be cooled with water, other non-water coolant, or a coolant gas whereby additional water may be removed from stream 54 through condensation (i.e., knocked out). In the case of a boiler for combustor 1, stream 54 may be cooled with boiler feed water. In this manner, the boiler feed water may be pre-heated prior to introduction in the boiler combustor 1 and the efficiency of the boiler combustor 1 and compression unit 3 are both increased. For example, when stream 54 is compressed to 16 bar, sufficient heat is generated to pre-heat boiler feed water to approximately 147° C. In a coal power plant, such pre-heating allows more steam turbine energy to be used for electricity generation. Suitable types of compressors include centrifugal, screw, reciprocating, and axial compressors.

With continued reference to FIG. 1, compressed, purified flue gas stream 55 is fed to an inlet of a gas separation membrane unit 4. The membranes of the gas separation membrane unit 4 allow selective permeation to form a low pressure $CO_2$ enriched permeate stream 57 and a $CO_2$ depleted stream non-permeate stream 58. The gas separation membranes of unit 4 may be operated at ambient or sub-ambient temperature.

When the gas separation membranes of unit 4 are operated at ambient temperature, the upstream water cooling is sufficient to bring stream 55 to ambient temperature.

When the membrane is operated at a sub-ambient temperature, such as 5° C. to −60° C., the required cold temperature is achieved through heat exchange between stream 56 and non-permeate stream 58 (after expansion of stream 58) and/or between stream 56 and PSA vent gas 64 (after expansion of stream 64). This heat exchange may be accomplished with a conventional heat exchanger, such as a plate fin, shell-in-tube, spiral wound, or brazed aluminum plate heat exchanger, or it may be a falling film evaporator as disclosed in EP 1008826, a heat exchanger derived from an automobile radiator as disclosed in US 2009/211733, or plate heat exchangers manufactured as disclosed in FR 2,930,464, FR 2,930,465, and FR 2,930,466. The heat exchangers in the cited patent publications are all incorporated herein by reference in their entireties. Typically, the heat exchanger is a brazed aluminum plate exchanger having multiple parallel cores allowing it to cool/heat a number of streams. The temperature of stream 54 should be maintained above its water freezing point. It should be noted that, with regard to all heating or cooling steps performed at heat exchangers, the skilled artisan will recognize that selection of which stream or streams are used to cool another stream or streams at a particular heat exchanger is well within the knowledge of a chemical engineer in the field of industrial gases.

The permeate stream 57 is fed to a suction inlet of a compression unit 5 where the combined stream is compressed to about 16-30 bar. The compression unit 5 contains one or more compressors selected from centrifugal, screw, reciprocating, and axial compressors. The compression unit 5 also typically uses boiler feed water for cooling of stream 57 so that further water may be knocked out (or optionally, to avoid flooding of a water removal adsorbent) and the boiler feed water may be preheated.

With continued reference to FIG. 1, the compressed stream 60, typically containing >60% vol $CO_2$) is then fed to a liquefaction unit 6 to produce high purity (<95% vol) liquid $CO_2$ and a vent gas stream 62. The high purity liquid $CO_2$ is re-gasified to produce gaseous $CO_2$ product 59. The cold temperature required for liquefaction of the $CO_2$ is substantially generated through heat exchange with stream 58 (after expansion) and/or stream 64 (after expansion). The cold temperature required for liquefaction may optionally also be generated through heat exchange with a portion of the high purity liquid $CO_2$ so as to cool compressed stream 60 and vaporize the high purity liquid $CO_2$. The liquefaction unit 6 may also include a pump to boost the pressure of high purity liquid $CO_2$ prior to re-gasification to produce the $CO_2$ product 61.

The $CO_2$-depleted vent gas 62, containing about 20-40% vol $CO_2$, is also fed to the gas separation membrane unit 4. Depending upon the pressure of the $CO_2$-depleted vent gas 62, it can first be expanded to the pressure of stream 55 as necessary.

The non-permeate stream 58, containing about 4-15% vol $CO_2$, is fed to pressure swing adsorption (PSA) unit 7. The PSA unit 7 contains a plurality of adsorbent columns. At PSA unit 7, $CO_2$ from stream 58 is selectively adsorbed so that a further $CO_2$ depleted vent gas 64 is produced that contains anywhere from 10 ppm vol to 4% vol of $CO_2$. The $CO_2$ depleted vent gas 64 is expanded at a turbo-expander 8 to recover useful energy and vented to atmosphere as stream 65.

The adsorbed $CO_2$ is partially recovered as a $CO_2$ blow-down stream 69. The $CO_2$ concentration of the $CO_2$ blow-down stream 69 is equal to or higher than that of stream 58 and is fed to the suction inlet of compressor 5. In the event that the $CO_2$ concentration fo the $CO_2$ blow-down stream 69 is lower than that of stream 58, as shown by the dotted line, it may instead be fed to the suction inlet of compressor 3.

With continued reference to FIG. 1, the adsorbent in PSA unit 7 is regenerated by an air stream 63, thereby producing a vent stream 66 that contains air and substantially the remaining desorbed $CO_2$. The air and desorbed $CO_2$-containing stream 66 is fed to combustor 1 as the entirety of, or as a portion of, the primary, secondary, tertiary (if present), and/or quaternary (if present) oxidant that is fed to the combustor. Stream 66 may be mixed with a portion of oxidant from one or more of streams 52 or may be fed to combustor 1 separately from streams 52. A wide variety of oxidant injection schemes are known in the field of combustion (especially combustion performed with recycled flue gas) and their details need not be recited herein. Some degree of moisture may remain adsorbed on adsorbent in PSA unit 7 after $CO_2$ desorption. In order to more effectively desorb that moisture, a portion of the air of stream 63 may either be dried (e.g. with zeolite 3A) or pre-heated upstream of PSA unit 7.

Figure 2:
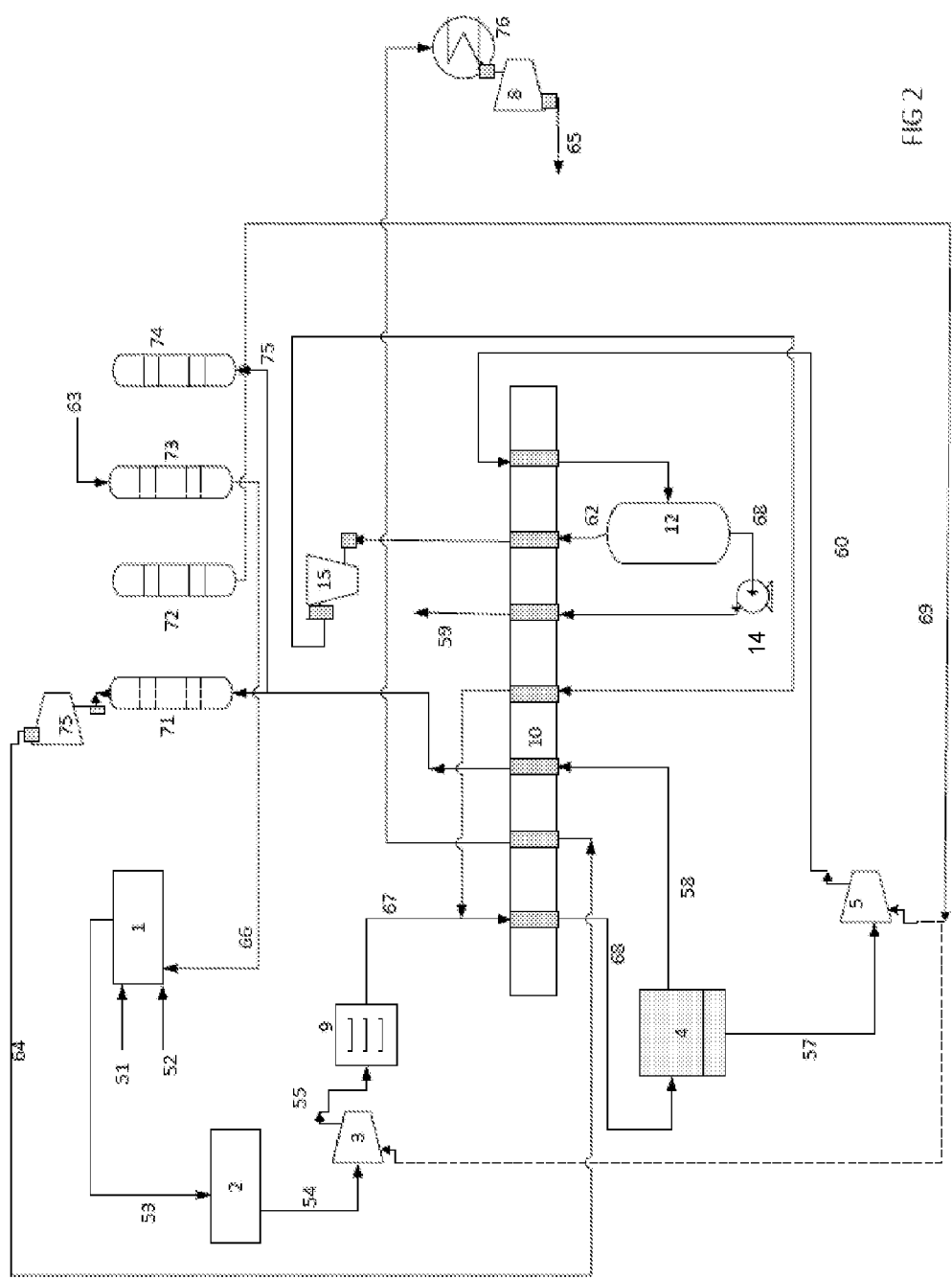
FIG. 2 is a schematic of an embodiment of the inventive method and system.

As shown in FIG. 2, one embodiment includes sub-ambient membrane separation and expansion of a non-permeate stream downstream of PSA separation.

Fuel 51 with one or more oxidant streams 52 and supplemental oxidant stream 66 are combusted in combustor 1 which is a boiler. The resulting flue gas stream 53 is purified in purification unit 2 for removal of impurities as described above. The purification unit 2 may optionally include a blower in order to provide adequate suction pressure for compressor 3.

As described above, the purified flue gas stream 54 is fed to the suction inlet of a compressor 3. As described above, compressor 3 may include one or more compressors which also typically includes water cooling of the compressed $CO_2$ enriched stream that may be used to preheat boiler feed water and for further water knock-out.

The compressed, purified flue gas stream 55 after water cooling is dried with an adsorbent-based moisture removal unit 9 that contains one or more adsorbent beds containing adsorbents known in the art for removal of moisture from gases.

The dried, compressed, purified flue gas stream 67 is then cooled at a heat exchanger 10. Exchanger 10 may be a multi-stream type heat exchanger adapted and configured to exchange heat between a plurality of streams. Typically, the multi-stream heat exchanger is a brazed aluminum plate exchanger having multiple parallel cores allowing it to cool/heat the plurality of streams. Alternatively, exchanger 10 could be a combination of several smaller heat exchangers not necessarily exchanging heat between each of the streams illustrated. A combination of several smaller heat exchangers is useful for segregation of higher pressure streams from low pressure streams.

Figure 3:
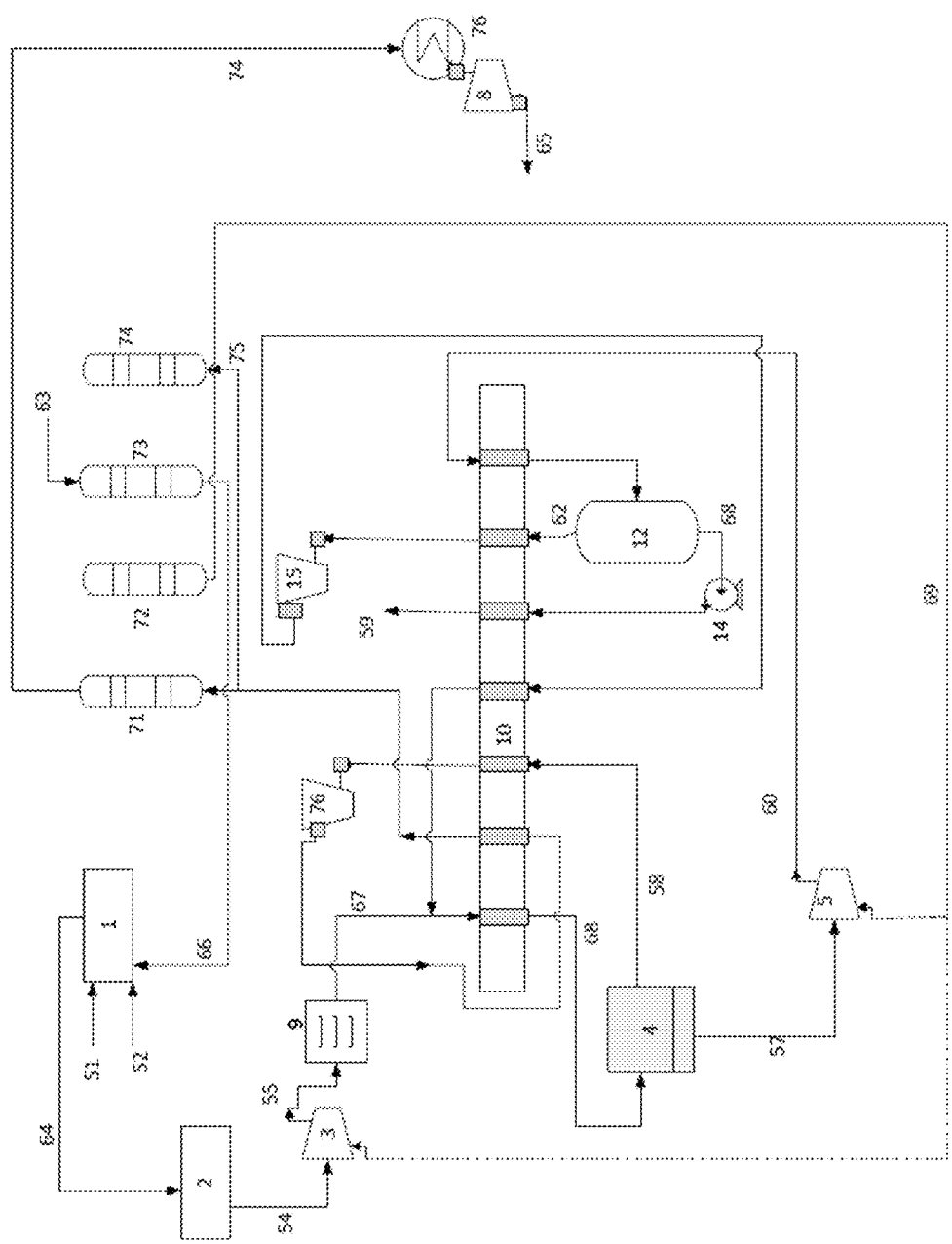
FIG. 3 is a schematic of another embodiment of the inventive method and system.

If several smaller heat exchangers are utilized instead of a multi-stream heat exchanger (such as illustrated in FIGS. 2-3), each particular heat exchanger will exchange heat between less than all of the streams illustrated. In this case, it should be noted that, with regard to all heating or cooling steps described and/or illustrated, the skilled artisan will recognize that selection of which stream or streams are used to cool another stream or streams at a particular heat exchanger is well within the knowledge of a chemical engineer in the field of industrial gases.

With continued reference to FIG. 2, the cold, dried, compressed, purified flue gas stream 68 is fed to a gas separation membrane unit 4. As described above, the membranes of the gas separation membrane unit 4 allow selective permeation to form a low pressure $CO_2$ enriched permeate stream 57 and a $CO_2$ depleted stream non-permeate stream 58. The gas separation membranes of unit 4 may be operated at ambient or sub-ambient temperature as described above.

The $CO_2$ enriched permeate gas 57 is re-compressed to about 6-30 bar in compressor 5. Compressor 5 also typically includes water cooling of stream 57 where the thus-heated water may be used as preheated boiler feed water. The water cooling of stream 57 also allows further water knock-out, but additional adsorbent-based drying may be included, if needed. The dried and compressed $CO_2$ enriched stream 60, having a concentration of >60% vol $CO_2$, is cooled in exchanger 10 to partially condense the $CO_2$.

The gaseous and liquid $CO_2$ phases are separated in phase separator 12. As shown in FIG. 2, phase separator 12 is a one pot phase separation unit producing a high purity, liquid $CO_2$ stream 68 and a cold vent stream 62. The pressure of the high purity, liquid $CO_2$ stream 68 is boosted to about 60-150 bar by a cryo-pump 14 and then warmed/vaporized at exchanger 10 to form high purity (>95% vol $CO_2$) product gas stream 59.

The cold vent stream 62 is passed through exchanger 10 and is optionally partially expanded in expander 15 to match the pressure of stream 67. After heat exchange and optional partial expansion, stream 62 is combined with stream 67.

The membrane residue stream 58 is warmed at exchanger 10 and fed to a PSA unit. FIG. 2 illustrates a PSA unit with four adsorbent bed columns 71, 72, 73, 74. However, the PSA unit is not limited to such a configuration. Rather, it may be configured according to any other schemes known in the field of adsorbent-based gas separation taking into consideration capital cost vs. capture efficiency trade-offs. For example, in FIG. 2 the adsorbent bed columns 71, 72, 73, 74 cycle through four modes of operation:

a) $CO_2$ adsorption mode 71,
b) let down of pressure in $CO_2$ blow down mode 72,
c) regeneration of adsorbent by desorption with air 73, and
d) using warmed stream 58, repressurization 74.

With continued reference to FIG. 2, $CO_2$ is selectively adsorbed from warmed stream 58 by the adsorbent in column 71. A further $CO_2$ depleted (10 ppm—4%) vent gas is expanded at expander 75 to provide a cold, expanded, $CO_2$-depleted stream 64. The cold, expanded, $CO_2$-depleted stream 64 is passed through exchanger 10 to provide the necessary cold energy (i.e., for removal of enthalpy) to cool stream 67 for sub-ambient membrane operation and also to partially condense stream 60. Depending on the available pressure and flow rate of stream 64 downstream of exchanger 10, it may be heated at heat exchanger 76 and then further expanded at turbo-expander 8 for energy recovery and vented as inert vent gas 65.

The pressure in column 72 is let down through venting to produce $CO_2$ blow-down stream 69. $CO_2$ blow-down stream 69 has a $CO_2$ concentration equal to or higher than that of stream 58 and is fed to the suction inlet of compressor 5. In the event that CO2 blow-down stream 69 has a $CO_2$ concentration lower than that of stream 58, as shown by the dotted line, it may instead be fed to the suction inlet of of compressor 3.

Air stream 63 at close to ambient pressure flows through column 73 to desorb $CO_2$. Some degree of moisture may remain adsorbed on adsorbent in column 73 after $CO_2$ desorption. In order to more effectively desorb that moisture, a final portion of the air of stream 63 may either be dried (e.g., with zeolite 3A) or pre-heated upstream of the PSA unit. The $CO_2$-enriched air stream 66 is fed to combustor 1 as described above.

Column 74 is pressurized with warmed stream 58. At the end of this step, the adsorbent is in position to begin the adsorption cycle again. Thus, in the next adsorption cycle, the columns 71, 72, 73, 74 are operated in the following modes:

e) $CO_2$ adsorption mode in column 74,
f) let down of pressure in $CO_2$ blow down mode in column 71,
g) regeneration of adsorbent by desorption with air in column 72, and
h) using stream 58, repressurization in column 73.

The columns 71, 72, 73, 74 are subsequently operated in the following modes:

a) $CO_2$ adsorption mode in column 73,
b) let down of pressure in $CO_2$ blow down mode in column 74,
c) regeneration of adsorbent by desorption with air in column 71, and
d) using stream 58, repressurization in column 72.

The columns 71, 72, 73, 74 are subsequently operated in the following modes:

a) $CO_2$ adsorption mode in column 72,
b) let down of pressure in $CO_2$ blow down mode in column 73,
c) regeneration of adsorbent by desorption with air in column 74, and
d) using stream 58, repressurization in column 71.

Subsequently, operation of the columns 71, 72, 73, 74 returns to the first above-described cycle for the following modes:

a) $CO_2$ adsorption mode in column 71,
b) let down of pressure in $CO_2$ blow down mode in column 72,
c) regeneration of adsorbent by desorption with air in column 73, and
d) using stream 58, repressurization in column 74.

As shown in FIG. 3, another embodiment also includes sub-ambient membrane separation and expansion of a non-permeate stream downstream of PSA separation. The embodiment of FIG. 3 is the same as FIG. 2 except for the following differences.

The further $CO_2$-depleted vent gas 74 from column 71 is not expanded for purposes of providing the necessary cold energy for cooling the combination of streams 62 and 67 and for partial condensation of stream 60. Rather, stream 74 is heated at heat exchanger 76 and then further expanded at turbo-expander 8 for energy recovery and vented as inert vent gas 65.

Also, after passing through exchanger 10 immediately downstream of the gas separation membrane unit 4, the non-permeate stream 58 is expanded at expander 76. The now-cold, expanded non-permeate stream 58 is passed through exchanger 10 in order to provide the necessary cold energy for cooling stream 67 and for partial condensation of stream 60, prior stream 58 being fed to column 71. In the embodiment of FIG. 3, the adsorption of $CO_2$ from stream 58 in column 71 takes place at a lower pressure and temperature than in the embodiment of FIG. 2.

Figure 4:
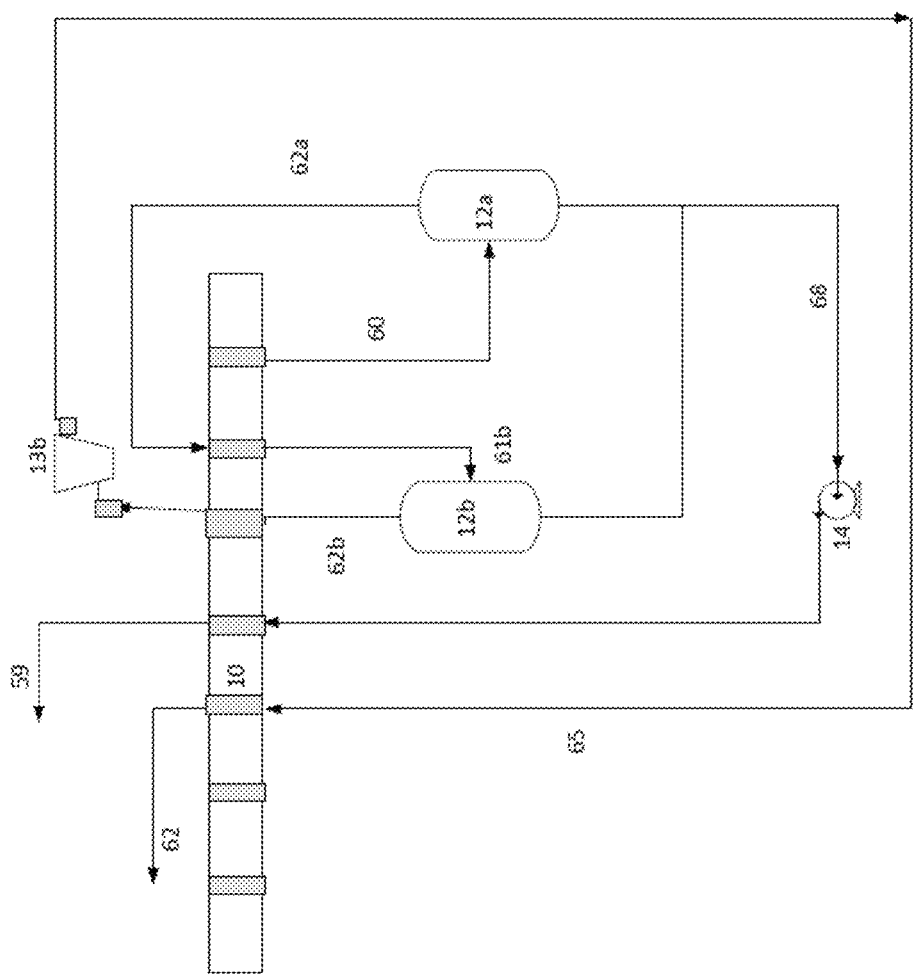
FIG. 4 is a schematic of a two-phase separator alternative to the single phase separator of FIG. 2 or FIG. 3.

While the embodiments of FIGS. 2 and 3 show one phase separator 12 for effecting separation of the partially liquefied stream 60 into vent gas stream 62 and $CO_2$ product 59, other schemes and apparatuses may be used for this separation. For example, instead of a single phase separator 12 (as in FIGS. 2 and 3), FIG. 4 includes two phase separators 12a, 12b. The embodiment of FIG. 4 can be thought of as a variation of the embodiment of FIG. 2 or a variation of the embodiment of FIG. 3 where all like-numbered reference characters denote a same apparatus or stream.

As described above, permeate stream 57 is compressed and partially condensed by compressor 5 and exchanger 10 to produce stream 60. Instead of being received in phase separator 12 (as in FIGS. 2 and 3), stream 60 is received in a first phase separator 12 of two in-series phase separators 12a, 12b. The gaseous overhead from phase separator 12a exits as stream 62a, is partially expanded across a Joule-Thomson valve, further cooled at exchanger 10, and partially condensed in phase separator 12b. The resulting vent gas stream 62b from phase separator 12b is optionally further expanded in expander 13b to provide vent gas stream 62.

The bottom $CO_2$-rich liquids exiting phase separators 12a, 12b is combined to provide high purity liquid $CO_2$ stream 68. The pressure of stream 68 is boosted at cryopump 14 and then vaporized at exchanger to form gaseous $CO_2$ product stream 59.

Figure 5:
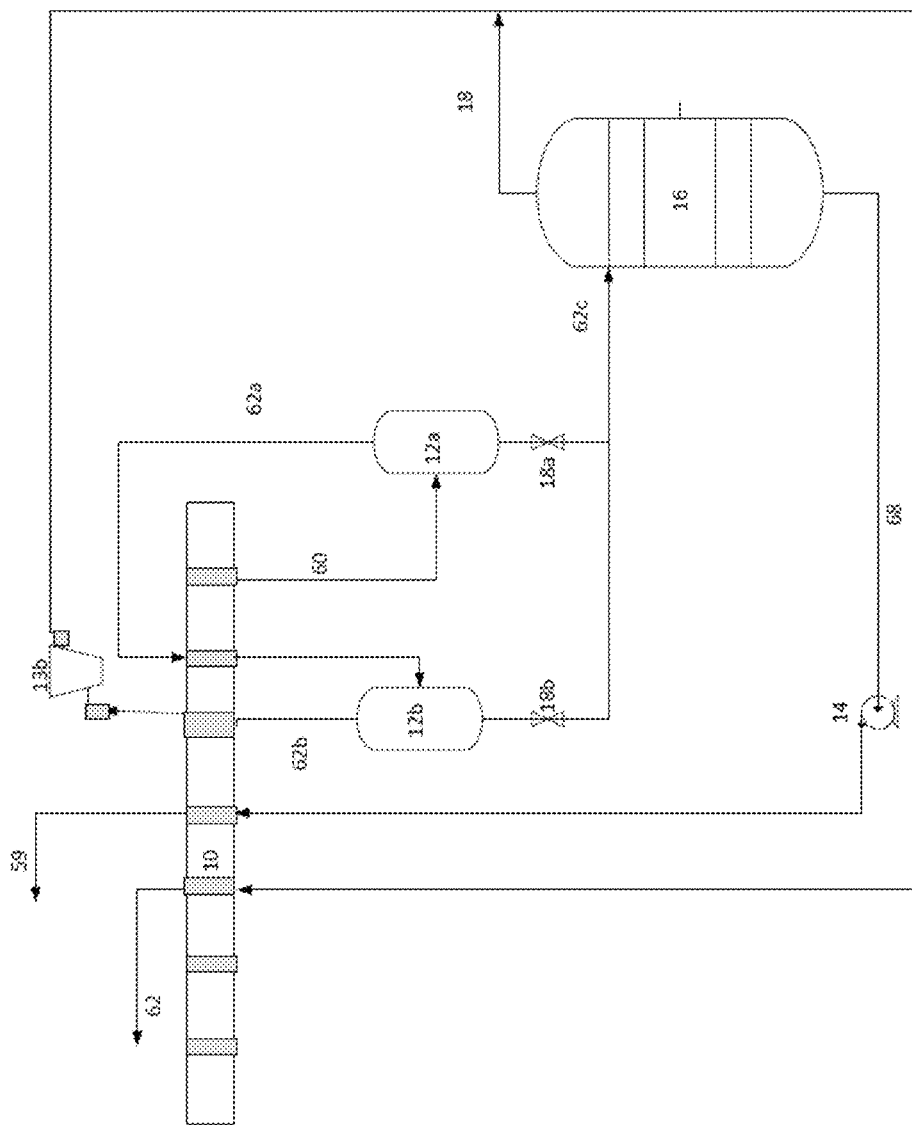
FIG. 5 is a schematic of a two-phase separator plus distillation column alternative to the single phase separator of FIG. 2 or FIG. 3.

As another example of a different scheme or apparatus for achieving separation of the partially condensed stream 60, FIG. 5 includes two phase separators 12a, 12b plus a distillation column. The embodiment of FIG. 5 can be thought of as a variation of the embodiment of FIG. 2 or a variation of the embodiment of FIG. 3 where all like-numbered reference characters denote a same apparatus or stream.

As explained above, permeate stream 57 is compressed and partially condensed by compressor 5 and exchanger 10 to produce stream 60. Instead of being received in phase separator 12 (as in FIGS. 2 and 3), stream 60 is received in a first phase separator 12 of two in-series phase separators 12a, 12b. The gaseous overhead from phase separator 12a exits as stream 62a, is partially expanded across a Joule-Thomson valve, further cooled at exchanger 10, and partially condensed in phase separator 12b. The resulting vent gas stream 62b from phase separator 12b is optionally further expanded in expander 13b.

The bottom $CO_2$-rich liquid exits phase separators 12a, 12b as streams 68a, 68b. Streams 68a, 68b are optionally expanded at Joule-Thomson valves 18a, 18b and fed to distillation column 16. $CO_2$-deficient vapor exits from a top of column 16 as vapor stream 18 and high purity liquid $CO_2$ exits a bottom of column 16 as high purity liquid $CO_2$ stream 68. Vapor stream 18 is combined with vent gas stream 62b to form $CO_2$-depleted vent gas 62. The pressure stream 68 is boosted at cryo-pump 14 and then vaporized at exchanger 5 to form gaseous $CO_2$ product stream 59.

Suitable materials for use in the gas separation membranes include polymeric materials having a $CO_2$ permeance is >100 GPU and a $CO_2/N_2$ selectivity >20 at the selected operational temperature and pressure. A variety of materials satisfying these criteria are well-known to those skilled in the art of gas separation membranes. For sub-ambient operation of the membranes, suitable polymeric materials exhibit a $CO_2$ solubility at 35° C. and 10 bar pressure of >0.03 [($cm^3$ of $CO_2$ at STP)/($cm^3$ of polymeric material)(cmHg)] and a glass transition temperature of >210° C. Particular polymeric materials meeting these requirements are disclosed in U.S. Pat. No. 8,617,292, the contents of incorporated herein by reference.

The skilled artisan in the field of gas separation will recognize that there is a wide variety of adsorbents known as effective for separating $CO_2$ from $CO_2$-containing gas mixtures through adsorption and the details of such adsorbents need not be replicated herein. The skilled artisan will similarly recognize that there is a wide variety of PSA techniques known as effective for separating gases from gas mixtures and the details of such adsorbents need not be replicated herein. Thus, the invention should be considered to be limited to the particular PSA technique described above with regard to FIGS. 2 and 3

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for recovering $CO_2$ from flue gas, comprising the steps of:
   removing impurities from a flue gas stream to provide a purified flue gas stream;
   compressing the purified flue gas stream at a first compressor and feeding it to a gas separation membrane unit comprising one or more gas separation membranes to produce a permeate stream and a non-permeate stream deficient in $CO_2$ compared to the permeate stream;
   compressing the permeate stream at a second compressor;
   cooling the permeate stream to produce a partially condensed permeate stream;
   separating the partially condensed permeate stream into a $CO_2$-deficient vent gas stream deficient in $CO_2$ compared to partially condensed permeate stream and high purity liquid $CO_2$ product;
   feeding the $CO_2$-deficient vent gas stream to the gas separation membrane unit;
   feeding the non-permeate stream to a PSA unit comprising one or more adsorbent beds to produce a further $CO_2$-depleted vent gas stream depleted in $CO_2$ compared to the non-permeate stream, a $CO_2$ blow-down stream enriched in $CO_2$ compared to the non-permeate stream, and a regeneration product stream, the regeneration product stream being produced by feeding a stream of air to the PSA unit to regenerate one of said one or more adsorbent beds and desorb $CO_2$ therefrom, the regeneration product stream being air enriched with the desorbed $CO_2$;
   compressing the $CO_2$ blow-down stream at the second compressor to combine it with the permeate stream; and
   combusting the regeneration product stream at a combustor that produces the flue gas.

2. The method of claim 1, further comprising the step of cooling the compressed purified flue gas stream at a heat exchanger to a temperature ranging from 5° C. to −60° C.

3. The method of claim 2, further comprising the step of expanding the further $CO_2$-depleted vent gas stream to lower a temperature thereof, wherein the compressed purified flue gas stream is cooled through heat exchange at the heat exchanger with the expanded further $CO_2$-depleted vent gas stream.

4. The method of claim 2, wherein the compressed purified flue gas stream is cooled through heat exchange at the heat exchanger with the $CO_2$-deficient vent gas stream prior to feeding the $CO_2$-deficient gas stream to the gas separation membrane unit.

5. The method of claim 4, wherein the $CO_2$-deficient vent gas stream is heat exchanged two times with the compressed purified flue gas stream and the $CO_2$-deficient vent gas stream is expanded to lower a temperature thereof in between the two times.

6. The method of claim 2, further comprising the step of vaporizing the high purity liquid $CO_2$ product at the heat exchanger to produce a high purity $CO_2$ product gas, wherein the compressed purified flue gas stream is cooled through heat exchange at the heat exchanger with the high purity liquid $CO_2$ product.

7. The method of claim 2, further comprising the step of expanding the non-permeate stream to lower a temperature thereof prior to being fed to the PSA unit, wherein compressed purified flue gas stream is cooled through heat exchange at the heat exchanger with the expanded non-permeate stream.

8. The method of claim 7, wherein the non-permeate stream is heat exchanged two times with the compressed purified flue gas stream and the non-permeate stream is expanded in between the two times.

9. The method of claim 1, wherein said step of separating is performed by separating the partially condensed permeate stream in a phase separator.

10. The method of claim 1, wherein said step of separating is performed by:
   separating the partially condensed permeate stream in a first phase separator into a first $CO_2$-deficient vent gas stream deficient in $CO_2$ compared to partially condensed permeate stream and a first high purity liquid $CO_2$ stream;
   expanding the first $CO_2$-deficient vent gas stream for partial condensation thereof;
   separating the partially condensed first $CO_2$-deficient vent gas stream into a second $CO_2$-deficient vent gas stream deficient in $CO_2$ compared to partially condensed permeate stream and a second high purity liquid $CO_2$ stream; and
   combining the first and second high purity liquid $CO_2$ streams to produce the high purity liquid $CO_2$ product.

11. The method of claim 1, wherein said step of separating is performed by:
   separating the partially condensed permeate stream in a first phase separator into a first $CO_2$-deficient vent gas stream deficient in $CO_2$ compared to partially condensed permeate stream and a first high purity liquid $CO_2$ stream;
   expanding the first $CO_2$-deficient vent gas stream for partial condensation thereof;
   separating the partially condensed first $CO_2$-deficient vent gas stream into a second $CO_2$-deficient vent gas stream deficient in $CO_2$ compared to partially condensed permeate stream and a second high purity liquid $CO_2$ stream;
   expanding each of the first and second high purity liquid $CO_2$ streams at first and second Joule-Thomson expanders;
   feeding the expanded high purity liquid $CO_2$ streams to a distillation column;
   withdrawing the high purity liquid $CO_2$ product from a bottom of the distillation column; and
   withdrawing a $CO_2$-deficient vapor stream from a top of the distillation column, wherein the $CO_2$-deficient vent gas stream is comprised of the second $CO_2$-deficient vent gas stream and the $CO_2$-deficient vapor stream.

12. A system for recovering $CO_2$ from flue gas, comprising:
   a combustor adapted and configured to combust fuel, oxidant, and supplemental oxidant to produce a flue gas stream;
   a purification unit in fluid communication with the combustor that is adapted and configured to purify the flue gas stream and produce a purified flue gas stream;
   a first compressor in fluid communication with the purification unit that is adapted and configured to compress the purified flue gas stream;
   a gas separation membrane unit in fluid communication with the first compressor that comprising one or more gas separation membranes adapted and configured to receive a feed gas stream from the first compressor and separate the feed gas stream into a permeate gas stream and a non-permeate gas stream that is deficient in $CO_2$ compared to the permeate gas stream;
   a second compressor in fluid communication with the gas separation membrane unit that is adapted and configured to receive and compress the permeate gas stream to produce a compressed permeate gas stream;
   at least one heat exchanger, at least one of the at least one heat exchanger being in heat transfer relation with the compressed permeate gas stream and being adapted and configured to cool the compressed permeate gas stream to produce a partially condensed permeate stream, at least one of the at least one heat exchanger being in heat transfer relation with the feed gas stream;
   a PSA unit comprising one or more adsorbent beds in fluid communication with the gas separation membrane unit that is adapted and configured to receive the non-permeate gas stream and an air stream and produce a $CO_2$ blow-down gas stream enriched in $CO_2$ compared to the non-permeate gas stream, a further $CO_2$-depleted vent gas stream, and a regeneration product stream, the one or more adsorbent beds being adapted and configured to adsorb $CO_2$ from the non-permeate stream, the regeneration product stream comprising air and $CO_2$ desorbed from the one or more adsorbent beds by the air stream, the combustor being further adapted and configured to receive the regeneration product stream from the PSA unit, the second compressor being further adapted and configured to compress the $CO_2$ blow-down stream along with the permeate stream; and
   a phase separation unit in fluid communication with the second compressor that is adapted and configured to receive the partially condensed permeate stream from the heat exchanger and separate the partially condensed permeate stream into a $CO_2$-deficient vent gas stream deficient in $CO_2$ compared to partially condensed permeate stream and a high purity liquid $CO_2$ stream, wherein the feed gas is a combination of the compressed purified flue gas and the $CO_2$-deficient vent gas stream.

13. The system of claim 12, further comprising an expander adapted and configured to expand the further $CO_2$-depleted vent gas stream to lower a temperature of the further $CO_2$-depleted vent gas stream, wherein at least one of the at least one heat exchanger is in heat transfer relation between, on one hand, the further $CO_2$-depleted vent gas stream, and on the other hand, either the feed gas stream or the compressed permeate stream.

14. The system of claim 12, wherein at least one of the at least one heat exchanger is in heat transfer relation between the feed gas stream and the $CO_2$-deficient vent gas stream.

15. The system of claim 12, wherein at least one of the at least one heat exchanger is in heat transfer relation between the high purity liquid $CO_2$ product and the feed gas stream and is further adapted and configured to vaporize the high purity liquid $CO_2$ product to produce a high purity $CO_2$ gas product.

16. The system of claim 12, further comprising an expander that is adapted and configured to expand the non-permeate stream to lower a temperature thereof, wherein at least one of the at least one heat exchanger is in heat transfer relation between the expanded non-permeate stream and the feed gas stream.

17. The system of claim 12, wherein the phase separation unit comprises one phase separator vessel.

18. The system of claim 12, wherein:

the phase separation unit comprises first and second phase separator vessels and a Joule-Thomson expander;

the first phase separator vessel is in fluid communication with the second compressor and is adapted and configured to receive the partially condensed permeate stream for phase separation into a first $CO_2$-deficient vent gas stream and a first liquid $CO_2$ stream;

the Joule-Thomson expander is in fluid communication between the first and second phase separator vessels and is adapted and configured to expand the first $CO_2$-deficient vent gas stream for partial condensation thereof;

the second phase separator vessel is in fluid communication with the Joule-Thomson expander and is adapted and configured to receive the partially condensed first $CO_2$-deficient vent gas stream for separation into a second $CO_2$-deficient vent gas stream and a second liquid $CO_2$ stream;

the high purity liquid $CO_2$ product is comprised of the first and second high purity liquid $CO_2$ streams; and the first compressor is in fluid communication with the second phase separator vessel to receive the second $CO_2$-deficient vent gas stream as the $CO_2$-deficient vent gas stream.

19. The system of claim 12, wherein:

the phase separation unit comprising first and second phase separator vessels, first, second, and third Joule-Thomson valves, and a distillation column;

the first phase separator vessel is in fluid communication with the second compressor and is adapted and configured to receive the partially condensed permeate stream for phase separation into a first $CO_2$-deficient vent gas stream and a first liquid $CO_2$ stream;

the first Joule-Thomson valve is in fluid communication between the first and second phase separator vessels and is adapted and configured to expand the first $CO_2$-deficient vent gas stream for partial condensation thereof;

the second phase separator vessel is in fluid communication with the first Joule-Thomson valve and is adapted and configured to receive the partially condensed first $CO_2$-deficient vent gas stream for separation into a second $CO_2$-deficient vent gas stream and a second liquid $CO_2$ stream;

the second and third Joule-Thomson valves are in fluid communication between the first and second phase separator vessel, respectively, and the distillation column;

the second and third Joule-Thomas valves are adapted and configured to expand the first and second liquid $CO_2$ streams;

the distillation column is adapted and configured to receive the expanded first and second liquid $CO_2$ streams and produce a high purity liquid $CO_2$ stream and a $CO_2$-deficient vapor stream;

the high purity liquid $CO_2$ product is comprised of the high purity liquid $CO_2$ stream; and first compressor is in fluid communication with the second phase separator vessel to receive the second $CO_2$-deficient vent gas stream and the distillation column to receive the $CO_2$-deficient vapor stream.

* * * * *